US012075761B2

(12) United States Patent
Cordero

(10) Patent No.: US 12,075,761 B2
(45) Date of Patent: Sep. 3, 2024

(54) ANIMAL FEEDING SYSTEM

(71) Applicant: Ayden Michael Cordero, Suisun City, CA (US)

(72) Inventor: Ayden Michael Cordero, Suisun City, CA (US)

(*) Notice: Subject to any disclaimer, the term of this patent is extended or adjusted under 35 U.S.C. 154(b) by 327 days.

(21) Appl. No.: 17/387,431

(22) Filed: Jul. 28, 2021

(65) Prior Publication Data
US 2022/0039350 A1 Feb. 10, 2022

Related U.S. Application Data

(60) Provisional application No. 63/062,352, filed on Aug. 6, 2020.

(51) Int. Cl.
*A01K 5/01* (2006.01)
*F16M 11/04* (2006.01)
*F16M 11/10* (2006.01)

(52) U.S. Cl.
CPC ......... *A01K 5/0114* (2013.01); *F16M 11/046* (2013.01); *F16M 11/10* (2013.01); *F16M 2200/022* (2013.01)

(58) Field of Classification Search
CPC .................................................. A01K 5/01
See application file for complete search history.

(56) References Cited

U.S. PATENT DOCUMENTS

| | | | | |
|---|---|---|---|---|
| 2003/0141420 A1* | 7/2003 | Knight | ...... | A47K 1/04 248/128 |
| 2008/0190372 A1* | 8/2008 | Horvath | ...... | A01K 5/01 119/61.56 |
| 2015/0308615 A1* | 10/2015 | Neaves | ...... | F16M 13/02 |

FOREIGN PATENT DOCUMENTS

GB 2025203 A * 9/1978 ............. A47J 36/00

* cited by examiner

*Primary Examiner* — Joshua J Michener
*Assistant Examiner* — Henry Hooper Mudd
(74) *Attorney, Agent, or Firm* — Robert Crownover

(57) ABSTRACT

A method and apparatus can include: providing a base; coupling a container supporting structure to the base; and coupling a container to the container supporting structure, the container having a rim and an inner surface, the container coupled to the container supporting structure with a pivot mechanism and a rotational brake, and wherein: the container supporting structure provides the container with a vertical offset from the base, the pivot mechanism provides the container with a rotational range of motion, and the rotational brake provides a resistance to movement within the rotational range of motion for angling the rim and the inner surface of the container to correct for an underbite or an overbite of an animal.

8 Claims, 5 Drawing Sheets

ANIMAL FEEDING SYSTEM

CROSS-REFERENCE TO RELATED APPLICATIONS

This claims priority benefit to all common subject matter of U.S. Provisional Patent Application 63/062,352 filed Aug. 6, 2020. The content of this application is incorporated herein by reference in its entirety.

TECHNICAL FIELD

This disclosure relates to feeding systems, more particularly to feeding systems for accommodating overbite and underbite.

BACKGROUND

Pets are common in modern life, with some estimates placing pet ownership at over sixty percent of households. Many pets struggle with deformations such as misalignment of teeth, which can impact the health and quality of life for the pet. Misalignment of teeth is seen in many types of pets including cats, dogs, horses, and others.

In dogs, for example, misalignment of teeth can be rare for some breeds and more common in others. Whether misalignment of teeth is common or rare for a specific breed of dog, misalignment can result in many lifelong and daily difficulties.

Illustratively, teeth misalignment can detrimentally affect how the animal holds and grasps food during feeding. A large potential market exists for solutions and systems that can reduce the difficulty during feeding caused by teeth misalignment.

Previous attempts to reduce the difficulty during feeding largely amount to hand feeding, while more permanent solutions included expensive dental surgery. In addition, to decreasing the difficulty for pets during feeding, development roadmaps for next generation products have identified caretaker labor and veterinary expense as major incentives to bringing a new solution to the market.

Solutions have been long sought but prior developments have not taught or suggested any complete solutions, and solutions to these problems have long eluded those skilled in the art. Thus, there remains a considerable need for devices and methods that can decrease the difficulty of pets having misaligned teeth during feeding.

BRIEF DESCRIPTION OF THE DRAWINGS

The animal feeding system is illustrated in the figures of the accompanying drawings which are meant to be exemplary and not limiting, in which like reference numerals are intended to refer to like components, and in which.

DETAILED DESCRIPTION

Figure 1:
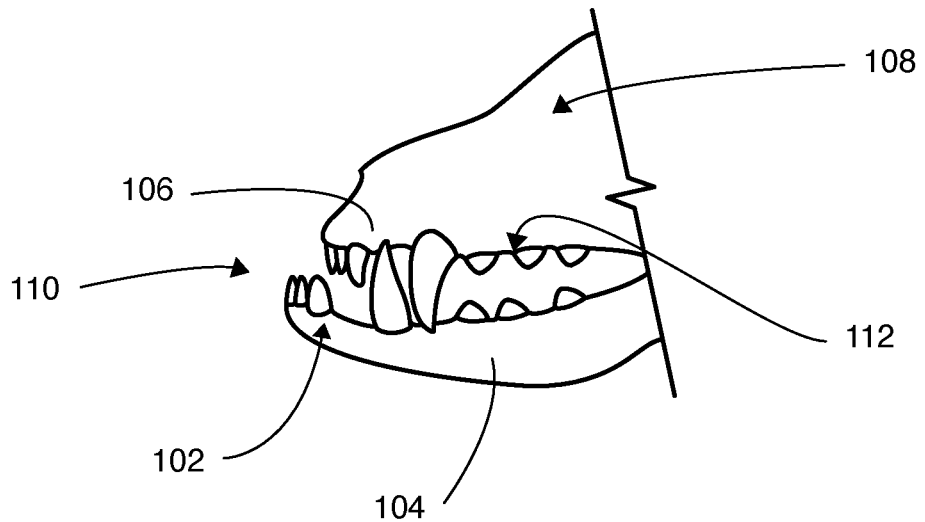
FIG. 1 is a side view of a dog underbite, which can be accommodated by the feeding system.

In the following description, reference is made to the accompanying drawings that form a part hereof, and in which are shown by way of illustration, embodiments in which the feeding system may be practiced. It is to be understood that other embodiments may be utilized and structural changes may be made without departing from the scope of the feeding system.

When features, aspects, or embodiments of the feeding system are described in terms of steps of a process, an operation, a control flow, or a flow chart, it is to be understood that the steps can be combined, performed in a different order, deleted, or include additional steps without departing from the feeding system as described herein.

The feeding system is described in sufficient detail to enable those skilled in the art to make and use the feeding system and provide numerous specific details to give a thorough understanding of the feeding system; however, it will be apparent that the feeding system may be practiced without these specific details.

In order to avoid obscuring the feeding system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGs.

As used herein, the term system is defined as a device or method depending on the context in which it is used. For expository purposes, the term "horizontal" as used herein is defined as a plane parallel to the bottom plane or surface of the base, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane. As used herein, the term couple as in "coupled" or "coupling" is defined as direct or indirect contact between elements.

Referring now to FIG. 1, therein is shown a side view of a dog underbite 102, which can be accommodated by the feeding system. The underbite 102 is also known in the veterinary arts as a malocclusion, or more specifically as prognathism.

The underbite 102 is shown with a lower jaw 104 extending past an upper jaw 106. The underbite 102 can be common and even hereditary for some breeds, such as pugs and bulldogs.

When feeding, the lower jaw 104 can prevent an animal 108 from biting or grasping food with a front portion 110 of the animal's mouth. This problem arises when the lower jaw 104 touches the surface of a serving dish containing food.

Unless the food is piled sufficiently high, the upper jaw 106 can be prevented from touching, and so grasping, food from the serving dish caused by the offset of the underbite 102. A horizontal surface can require the animal 108 to turn its head sideways so that the food can be grasped with a side 112 of the mouth rather than between the front portion 110 of the animal's mouth.

Figure 2:
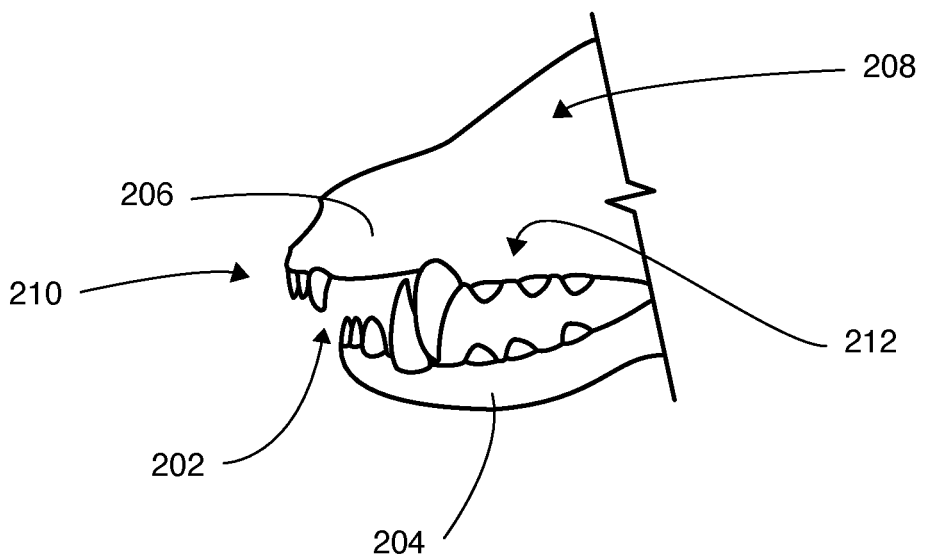
FIG. 2 is a side view of a dog overbite, which can be accommodated by the feeding system.

Referring now to FIG. 2, therein is shown a side view of a dog overbite 202, which can be accommodated by the feeding system. The overbite 202 is also known in the veterinary arts as a malocclusion, or more specifically as mandibular brachygnathism.

The overbite 202 is shown with a lower jaw 204 and an upper jaw 206 misaligned. More particularly, the upper jaw 206 is shown extending past the lower jaw 204. The overbite 202 can be common and even hereditary for some breeds with longer muzzles, such as Dachshunds and Shelties.

When feeding, the upper jaw 206 can prevent an animal 208 from biting or grasping food with a front portion 210 of the animal's mouth. This problem arises when the upper jaw 206 touches the surface of a serving dish containing food.

Unless the food is piled sufficiently high, the lower jaw 204 can be prevented from touching, and so grasping, food from the serving dish caused by the offset of the overbite 202. A horizontal surface can require the animal 208 to turn its head sideways so that the food can be grasped with a side 212 of the mouth rather than between the front portion 210 of the animal's mouth Referring now to FIG. 3, therein is shown a front side view of the feeding system 300 in a first embodiment. The feeding system can include a base 302. The base is shown extending horizontally and providing lateral rigidity to the feeding system 300.

The base 302 can be manufactured out of many materials including plastic, metal, or organic materials like wood. The base 302 is depicted having a foot pad 304 extending along a bottom plane or surface of the base 302.

The foot pad 304 is shown as a single rubber foot. In alternative embodiments the foot pad 304 is contemplated to be comprised of multiple feet positioned on the bottom plane or surface of the base 302.

The base 302 can include a stabilizing weight for providing further lateral support to the feeding system 300. The weight can be manufactured from lead or similarly dense material.

The base 302 can be coupled to a container supporting structure 306 through a vertical extension 308. The vertical extension 308 can be formed as a solid vertical extension for maintaining a constant offset between the container supporting structure 306 and the base 302.

The vertical extension 308 can be cylindrically shaped and can be affixed to the base 302 with washers 310 therebetween. The washers 310 can allow the vertical extension 308 to be rigidly affixed to the base 302 even when the base 302 is manufactured from softer materials such as soft woods or plastics.

The container supporting structure 306 can be rigidly coupled to the vertical extension 308 to provide rotational support. It is alternatively contemplated that the container supporting structure 306 can be coupled to the vertical extension 308 and allow for rotational movement about an axis in the direction of the vertical extension 308.

The vertical extension 308 can extend through the container supporting structure 306 with the container supporting structure 306 fully circumscribing the vertical extension 308. The vertical extension 308 and the container supporting structure 306 can be manufactured from a variety of materials including plastic, metal, or wood.

The container supporting structure 306 can be coupled to a container 312 having a rim 314, an inner surface 316, and an outer surface 318. The container 312 is depicted as a deeper rounded bowl, which has been found to be more effective at correcting for the underbite 102 of FIG. 1 or the overbite 202 of FIG. 2, relative to shallower flatter bowls.

The container 312 can be manufactured from materials similar to those used to construct the container supporting structure 306. The container 312 is shown coupled to the container supporting structure 306 with a pivot mechanism 320 and a rotational brake 322.

The container supporting structure 306 can extend in a curve, from the pivot mechanism 320 to the vertical extension 308. The container supporting structure 306 provides the container 312 with a vertical offset from the base 302.

The pivot mechanism 320 can provide the container 312 with a rotational range of motion about the pivot mechanism 320. The rotational brake 322 can provide a resistance by direct contact between the rotational brake 322, the container 312, and the container supporting structure 306. The rotational brake 322 can resist movement within the rotational range of motion for angling the rim 314 and the inner surface 316 of the container 312 to correct for the underbite 102 or the overbite 202.

The rotational brake 322 can be a rotational friction brake providing a resistance to motion within the rotational range of motion of the container 312. It is contemplated that the rotational brake 322 can be manufactured from rubber or plastic. It is contemplated that because the friction radius is small other composite materials could be used to further increase the rotational resistance.

The rotational brake 322 can further be a rotational ratchet for providing one way rotational movement. In yet another contemplated embodiment the rotational ratchet could provide alternating high and low areas of resistance along the rotational range of motion such that the container 312 can be moved into position and held by the high areas of resistance within the rotational range of motion.

The pivot mechanism 320 can be coupled to a tightening mechanism 324. The tightening mechanism 324 is shown as a nut, but is contemplated to be a bolt, a screw head, or a quick release utilizing a cam and a lever. The tightening mechanism 324 can increase resistance to movement on the rotational brake 322 and thereby increase rotational resistance.

In the present embodiment the container 312 can include a through hole extending from the inner surface 316 to the outer surface 318. The pivot mechanism 320 can extend through the through hole. Other contemplated embodiments do not utilize a through hole but can employ an embedded nut or threaded hole.

Figure 3:
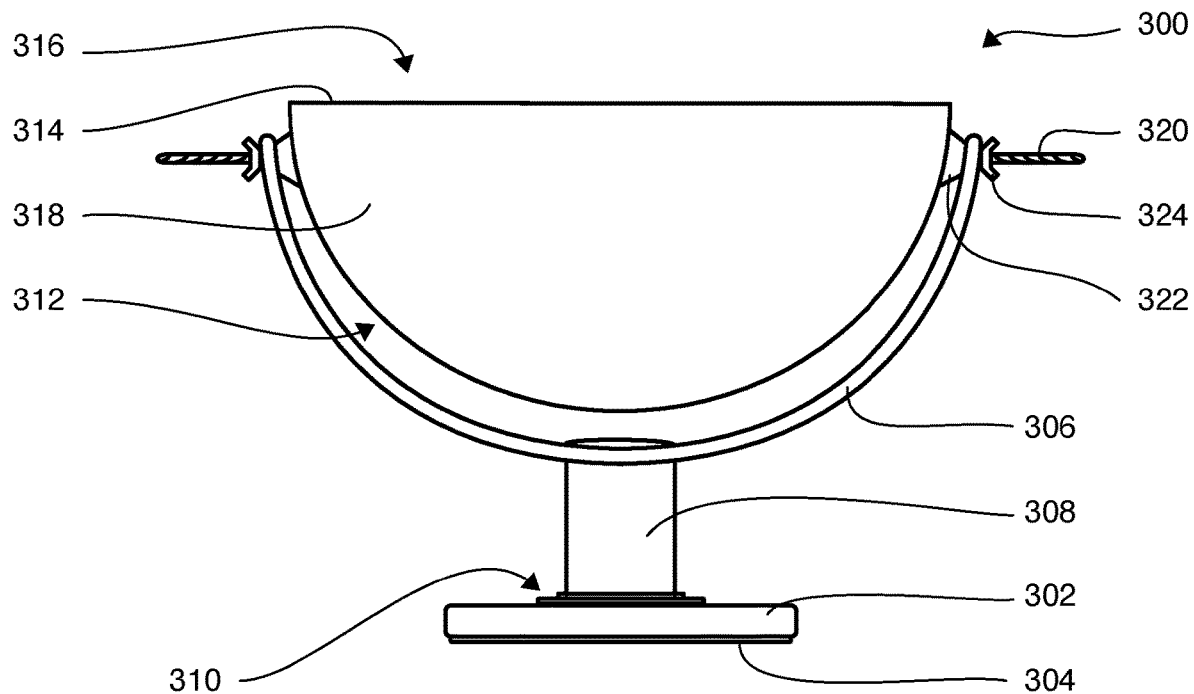
FIG. 3 is a front side view of the feeding system in a first embodiment.
Figure 4:
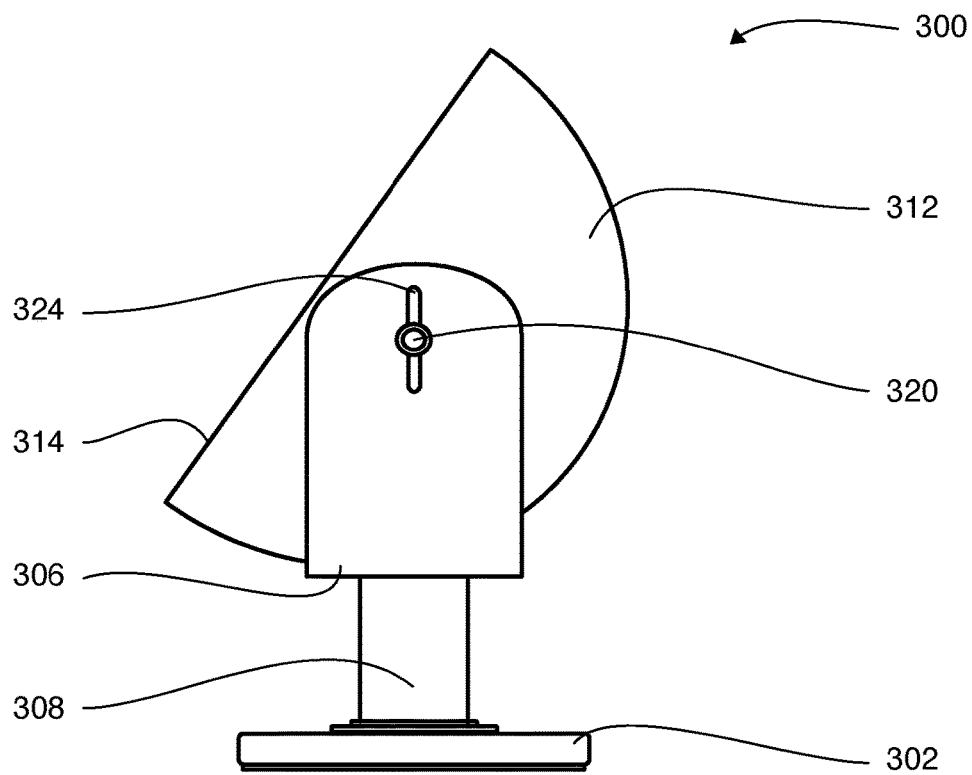
FIG. 4 is a left side view of the feeding system of FIG. 3 in a tilted configuration.

Referring now to FIG. 4, therein is shown a left side view of the feeding system 300 of FIG. 3 in a tilted configuration. The container 312 is shown tilted with respect to the base 302. Tilting the container 312 toward the animal can allow the animal to grasp and bite food with the front portion 110 of FIG. 1 of the animal's mouth and correct for the underbite 102 of FIG. 1 or the overbite 202 of FIG. 2.

More particularly, the rim 314 of the container 312 is shown at an angle pivoted about the pivot mechanism 320. The rotational brake 322 of FIG. 3 can be engaged by tightening the tightening mechanism 324 anchoring the container 312 in the desired angle. The container supporting structure 306 and the vertical extension 308 are shown extending orthogonally from the base 302.

Figure 5:
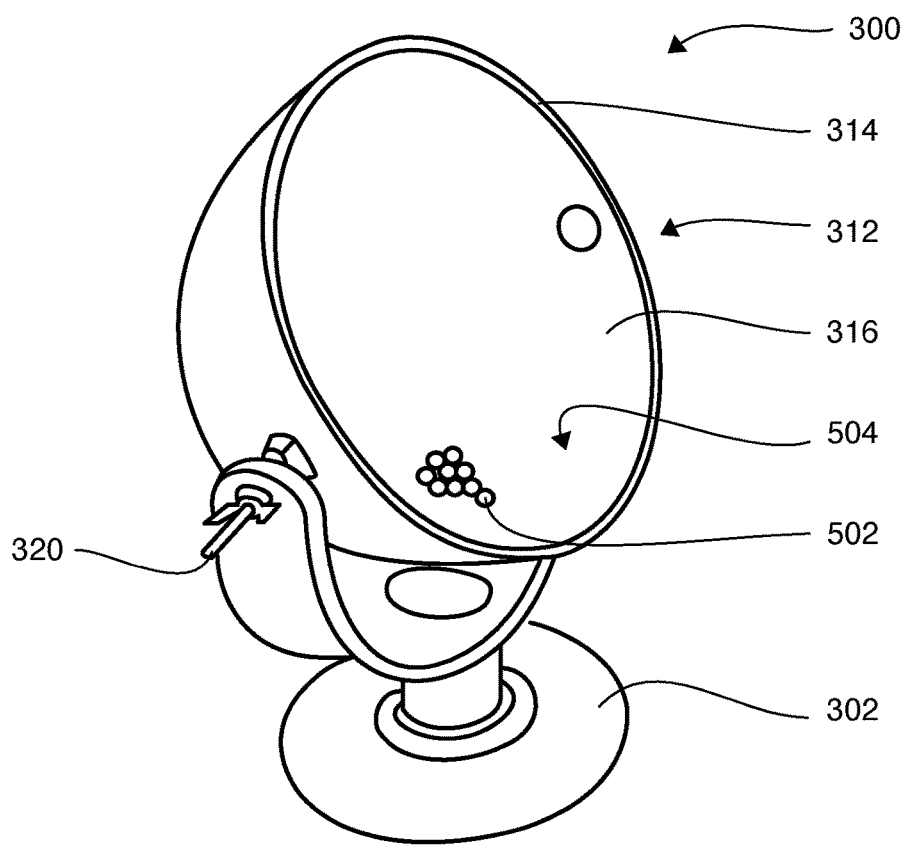
FIG. 5 is an isometric view of the feeding system of FIG. 4.

Referring now to FIG. 5, therein is shown an isometric view of the feeding system 300 of FIG. 4. The container 312 is depicted having food 502 deposited therein.

The food 502 can be positioned along a side portion 504 of the inner surface 316 of the container 312. The container 312 can allow the food 502 to move along the inner surface 316 to the side portion 504 of the container 312 so that the food 502 can be positioned for better grasping and biting with the overbite 202 of FIG. 2 or the underbite 102 of FIG. 1.

Figure 6:
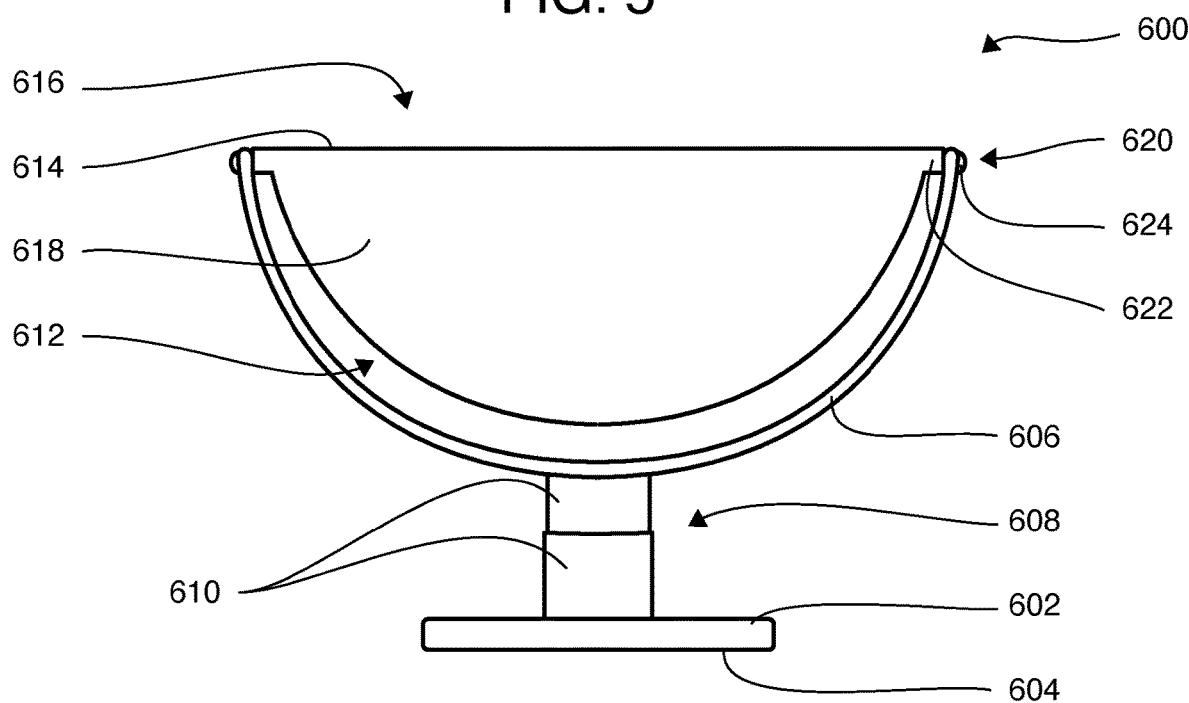
FIG. 6 is a front side view of the feeding system in a second embodiment.

Referring now to FIG. 6, therein is shown a front side view of the feeding system 600 in a second embodiment. The feeding system can include a base 602. The base is shown extending horizontally and providing lateral rigidity to the feeding system 600.

The base 602 can be manufactured out of many materials including plastic, metal, or organic materials like wood. The base 602 can include a stabilizing weight for providing further lateral support to the feeding system 600. The weight can be manufactured from lead or similarly dense material.

The base 602 can be coupled to a container supporting structure 606 through a vertical extension 608. The vertical extension 608 is shown as a telescoping vertical extension with for changing the offset between the container supporting structure 606 and the base 602.

The vertical extension 608 can include telescoping components 610 including an inner sliding member and an outer sliding member. The inner sliding member and the outer sliding member can move relative to one another in order to increase or decrease the length of the vertical extension 608.

The vertical extension 608 can be cylindrically shaped and can be affixed to the base 602. The container supporting structure 606 can be rigidly coupled to the vertical extension 608 to provide rotational support. It is alternatively contemplated that the container supporting structure 606 can be coupled to the vertical extension 608 and allow for rotational movement about an axis in the direction of the vertical extension 608.

The vertical extension 608 can extend up to but not entirely through the container supporting structure 606 with the container supporting structure 606 fully circumscribing the vertical extension 608 and fully covering an end of the vertical extension 608. The vertical extension 608 and the container supporting structure 606 can be manufactured from a variety of materials including plastic, metal, or wood.

The container supporting structure 606 can be coupled to a container 612 having a rim 614, an inner surface 616, and an outer surface 618. The container 612 is depicted as a deeper rounded bowl, which has been found to be more effective at correcting for the underbite 102 of FIG. 1 or the overbite 202 of FIG. 2, relative to shallower flatter bowls.

The container 612 can be manufactured from materials similar to those used to construct the container supporting structure 606. The container 612 is shown coupled to the container supporting structure 606 with a pivot mechanism 620 and a rotational brake 622.

The container supporting structure 606 can extend in a curve, from the pivot mechanism 620 to the vertical extension 608. The container supporting structure 606 provides the container 612 with a vertical offset from the base 602.

The pivot mechanism 620 can provide the container 612 with a rotational range of motion about the pivot mechanism 620. The rotational brake 622 can provide a resistance by direct contact between the rotational brake 622, the container 612, and the container supporting structure 606. The rotational brake 622 can resist movement within the rotational range of motion for angling the rim 614 and the inner surface 616 of the container 612 to correct for the underbite 102 or the overbite 202.

The rotational brake 622 can be a rotational friction brake providing a resistance to motion within the rotational range of motion of the container 612. It is contemplated that the rotational brake 622 can be manufactured from rubber or plastic and formed integrally with the container 612 as a portion of the container 612. It is contemplated that because the friction radius is small other composite materials could be used to further increase the rotational resistance.

The rotational brake 622 can further be a rotational ratchet for providing one way rotational movement. In yet another contemplated embodiment the rotational ratchet could provide alternating high and low areas of resistance along the rotational range of motion such that the container 612 can be moved into position and held by the high areas of resistance within the rotational range of motion.

The pivot mechanism 620 can be coupled to a tightening mechanism. The tightening mechanism can be a nut, a bolt, a screw head, or a quick release utilizing common quick release components including a cam and a lever. The tightening mechanism can increase resistance to movement on the rotational brake 622 and thereby increase rotational resistance.

The tightening mechanism can be flush with the container supporting structure 606, extending completely through the rotational brake 622 and the container supporting structure 606. The tightening mechanism is shown covered with a tightening mechanism end cap 624.

In the present embodiment, the tightening mechanism can be formed as the same component as the pivot mechanism 620, which for example can be illustrated as a bolt extending through the container supporting structure 606, through the rotational brake 622, and into the container 612 all while providing a flush fit with the external surface of the container supporting structure 606.

In the present embodiment the container 612 can include a hole extending from the outer surface 618 into the container 612 without extending through the inner surface 616. The container 612 can thus provide an embedded nut or threaded hole for the pivot mechanism 620 to screw into.

Figure 7:
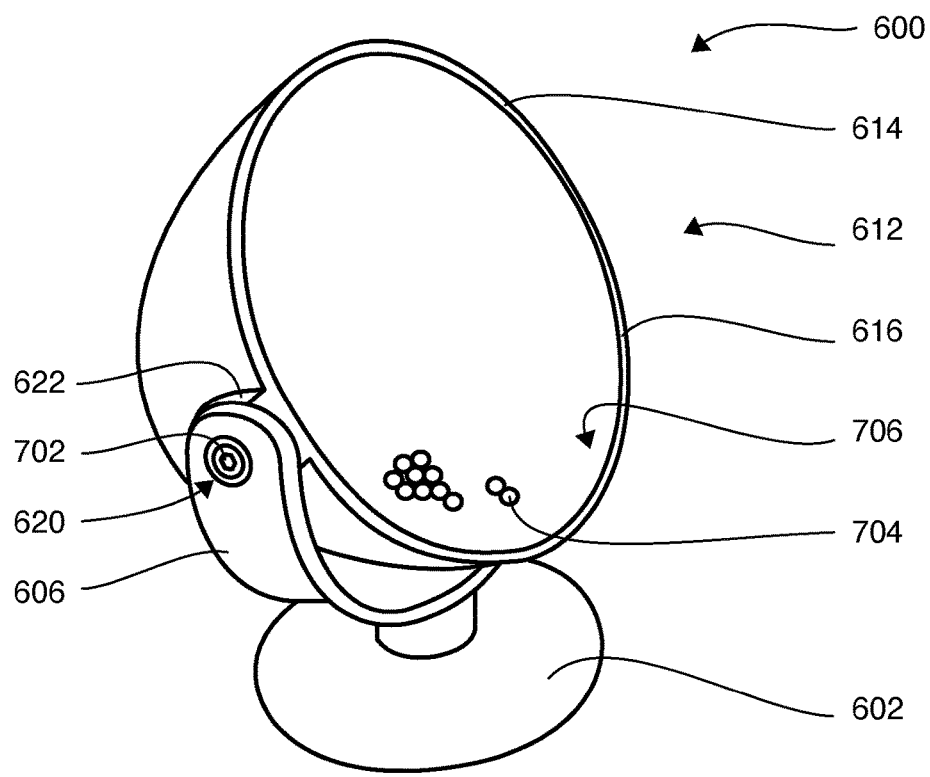
FIG. 7 is an isometric view of the feeding system of FIG. 6 in a tilted configuration.

Referring now to FIG. 7, therein is shown an isometric view of the feeding system 600 of FIG. 6 in a tilted configuration. The container 612 is shown tilted with respect to the base 602. Tilting the container 612 toward the animal can allow the animal to grasp and bite food with the front portion 110 of FIG. 1 of the animal's mouth and correct for the underbite 102 of FIG. 1 or the overbite 202 of FIG. 2.

More particularly, the rim 614 of the container 612 is shown at an angle pivoted about the pivot mechanism 620. The rotational brake 622 can be engaged by tightening a tightening mechanism 702.

The tightening mechanism 702 is depicted as a hex bolt without the tightening mechanism end cap 624 of FIG. 6 and showing the tightening mechanism 702 flush with the container supporting structure 606. The tightening mechanism 702 can anchor the container 612 in the desired angle.

The container supporting structure 606 and the vertical extension 608 are shown extending orthogonally from the base 602. The container 612 is depicted having food 704 deposited therein.

The food 704 can be positioned along a side portion 706 of the inner surface 616 of the container 612. The container 612 can allow the food 704 to move along the inner surface 616 to the side portion 706 of the container 612 so that the food 704 can be positioned for better grasping and biting with the overbite 202 or the underbite 102.

Figure 8:
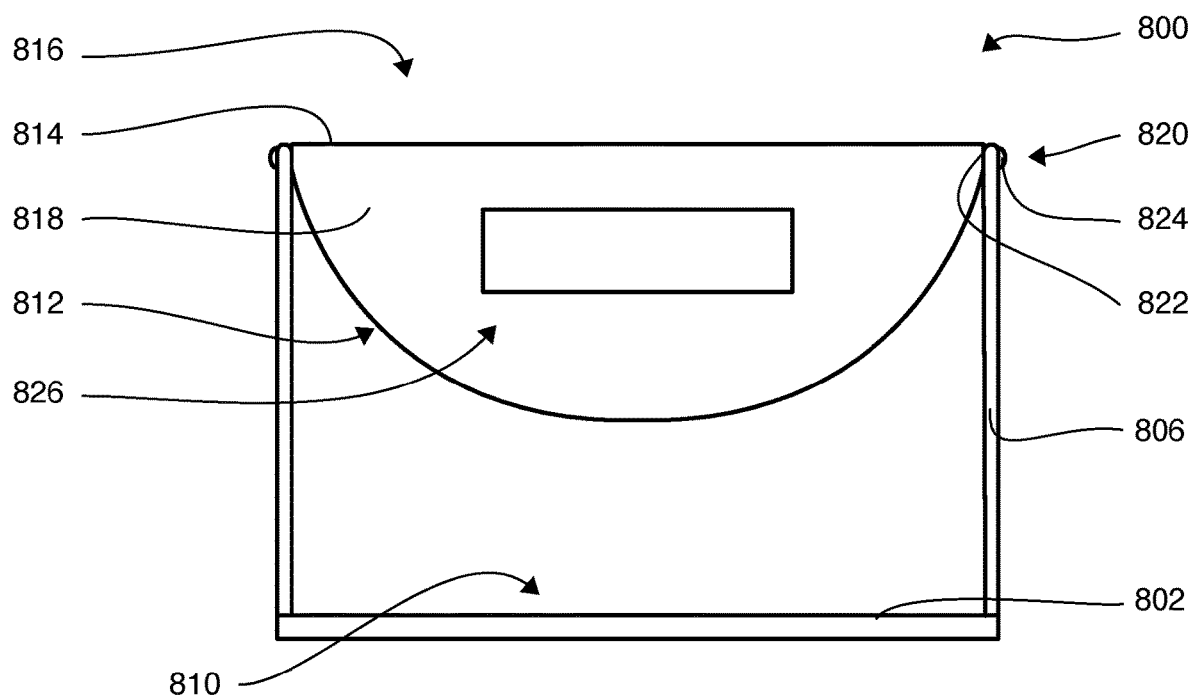
FIG. 8 is a front side view of the feeding system in a third embodiment.

Referring now to FIG. 8, therein is shown a front side view of the feeding system 800 in a third embodiment. The feeding system can include a base 802. The base is shown extending horizontally and providing lateral rigidity to the feeding system 800.

The base 802 can be manufactured out of many materials including plastic, metal, or organic materials like wood. The base 802 is depicted having an exposed bottom plane or surface of the base 802 for direct contact with a supporting surface.

The base 802 can include a stabilizing weight for providing further lateral support to the feeding system 800. The weight can be manufactured from lead or similarly dense material.

The base 802 can be coupled to a container supporting structure 806. The container supporting structure 806 can be manufactured from a variety of materials including plastic, metal, or wood.

The container supporting structure 806 can be coupled to a container 812 having a rim 814, an inner surface 816, and an outer surface 818. The container 812 is depicted as a deep rounded bowl, which has been found to be more effective at correcting for the underbite 102 of FIG. 1 or the overbite 202 of FIG. 2, relative to shallower flatter bowls.

The container 812 can be manufactured from materials similar to those used to construct the container supporting structure 806. The container 812 is shown coupled to the container supporting structure 806 with a pivot mechanism 820 and a rotational brake 822.

The pivot mechanism 820 is depicted as a bolt, and force provided by the rotational brake 822 is increased by tightening the pivot mechanism. Illustratively, for example, the pivot mechanism 820 can be a bolt screwed directly into a nut or threaded hole embedded within the side of the container 812.

The pivot mechanism 820 can provide the container 812 with a rotational range of motion about the pivot mechanism 820. The rotational brake 822 can be comprised of direct contact between the container 812 and the container supporting structure 806. The rotational brake 822 can resist movement within the rotational range of motion for angling the rim 814 and the inner surface 816 of the container 812 to correct for the underbite 102 or the overbite 202.

The rotational brake 822 can be a rotational friction brake providing a resistance to motion within the rotational range of motion of the container 812. It is contemplated that because the friction radius is small other composite materials could be used to further increase the rotational resistance.

The rotational brake 822 can further be a rotational ratchet for providing one way rotational movement. In yet another contemplated embodiment the rotational ratchet could provide alternating high and low areas of resistance along the rotational range of motion such that the container 812 can be moved into position and held by the high areas of resistance within the rotational range of motion.

The pivot mechanism 820 can be coupled to a tightening mechanism 824. The tightening mechanism 824 is shown as the head of a bolt, but is contemplated to be a screw head, a nut, or a quick release utilizing a cam and a lever. The tightening mechanism 824 can increase force on the rotational brake 822 and thereby increase rotational resistance.

In the present embodiment the container 812 does not include a through hole extending from the inner surface 816 to the outer surface 818. The pivot mechanism 820 can extend through the outer surface 818 but not penetrate the inner surface 816.

The container supporting structure 806 can extend from the pivot mechanism 820 to contact a corner of the base 802. The container supporting structure 806 provides the container 812 with a vertical offset from the base 802.

The container 812 is further depicted including a name plate 826. The name plate 826 can be a metal, plastic, or wood name plate affixed to the outer surface 818 of the container 812 with an adhesive or can be etched into the outer surface 818 of the container 812.

Figure 9:
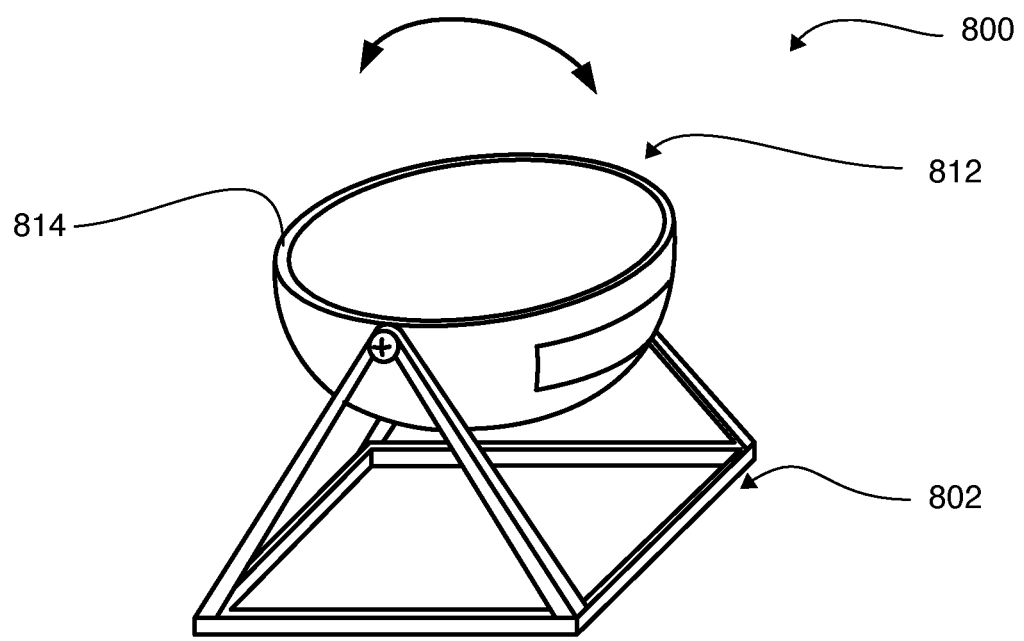
FIG. 9 is an isometric view of the feeding system of FIG. 8.

Referring now to FIG. 9, therein is shown an isometric view of the feeding system 800 of FIG. 8. The container 812 can be tilted with respect to the base 802. Tilting the container 812 toward the animal 108 of FIG. 1 can allow the animal 108 to grasp and bite food with the front portion 110 of FIG. 1 of the animal's mouth and correct for the underbite 102 of FIG. 1 or the overbite 202 of FIG. 2.

More particularly, the rim 814 of the container 812 can be angled towards a front or a back with respect to the animal 108 using the feeding system 800. Tilting the container 812 back has been discovered to help animals with the underbite 102 to grasp and bite food. Conversely, tilting the container 812 forward has been discovered to help animals with the overbite 202 to grasp and bite food.

Figure 10:
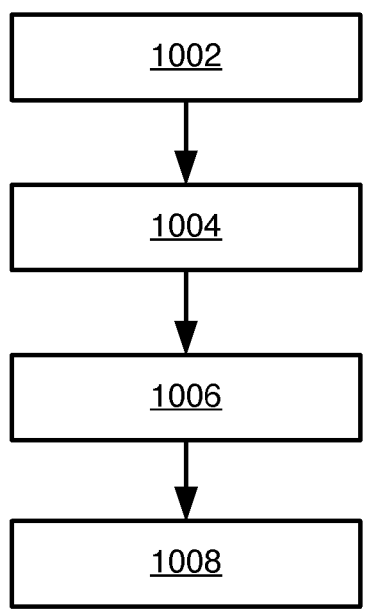
FIG. 10 is a method of manufacturing the feeding system.

Referring now to FIG. 10, therein is shown a method of manufacturing the feeding system. The method of manufacturing can include providing a base in a block 1002; coupling a vertical extension extending from the base in a block 1004; coupling a container supporting structure to the base directly or through a vertical extension in a block 1006; and coupling a container to the container supporting structure, the container having a rim and an inner surface, the container coupled to the container supporting structure with a pivot mechanism and a rotational brake, and wherein: the container supporting structure provides the container with a vertical offset from the base, the pivot mechanism provides the container with a rotational range of motion, and the rotational brake provides a resistance to movement within the rotational range of motion for angling the rim and the inner surface of the container to correct for an underbite or an overbite of an animal in a block 1008.

Thus, it has been discovered that the feeding system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the feeding system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A method of manufacturing a feeding system comprising:
   providing a base;
   coupling a container supporting structure to the base; and
   coupling a container to the container supporting structure, the container having a rim and an inner surface, the container coupled to the container supporting structure with a pivot mechanism and a rotational brake, and wherein:
   the container supporting structure provides the container with a vertical offset from the base,
   the pivot mechanism provides the container with a rotational range of motion, and
   the rotational brake provides a resistance to movement within the rotational range of motion for angling the rim and the inner surface of the container to correct for an underbite or an overbite of an animal.

2. The method of claim 1, further comprising coupling a name plate to the container.

3. The method of claim 1, wherein coupling the container to the container supporting structure with the rotational brake includes coupling with a rotational friction brake, a rotational ratchet, or a combination thereof.

4. The method of claim 1, wherein coupling the container to the container supporting structure with the pivot mechanism includes coupling with a bolt, and the resistance to movement provided by the rotational brake is increased by tightening the bolt.

5. The method of claim 1, further comprising coupling a vertical extension to the base and the container supporting structure.

6. The method of claim 5, wherein coupling the container supporting structure includes coupling the container supporting structure extending, with a curve, from the pivot mechanism to the vertical extension.

7. The method of claim 5, wherein coupling the container to the container supporting structure with the pivot mechanism includes mounting the pivot mechanism flush with the container supporting structure.

8. The method of claim 5, wherein coupling the vertical extension includes coupling a telescoping vertical extension.

* * * * *